Aug. 17, 1926.

J. TAMBERLIN 1,596,257

CONTROL MECHANISM

Filed Sept. 8. 1924

Inventor:
John Tamberlin,
Attorney.

Aug. 17, 1926.

J. TAMBERLIN

1,596,257

CONTROL MECHANISM

Filed Sept. 8, 1924    4 Sheets-Sheet 4

Inventor:
John Tamberlin,
By
Attorney.

Patented Aug. 17, 1926.

1,596,257

UNITED STATES PATENT OFFICE.

JOHN TAMBERLIN, OF TRAPPE BOROUGH, PENNSYLVANIA, ASSIGNOR TO GEORGE W. BLABON COMPANY, OF PHILADELPHIA, PENNSYLVANIA, A CORPORATION OF PENNSYLVANIA.

CONTROL MECHANISM.

Application filed September 8, 1924. Serial No. 736,612.

My invention is designed to provide improved means for controlling the sequential operation of devices, such as printing blocks of machines for printing rug designs on linoleums or the like.

Leading objects of my invention are to provide means whereby the operations of the devices to be controlled may be varied by the manipulation or change of a single master controller so that, for instance, the length of rugs being printed in series may be changed at will without interfering with the continuity of operation of the machine; and whereby one or more of the controlled devices may be rendered inoperative without effecting the proper relative action of the remaining devices, so that, for instance, certain printing blocks may be held inactive during all or any part of a run.

In the preferred embodiment of my invention, a master controller is automatically operated in synchronism with the machine and may also be manually operated or rendered inoperative. The master controller is so connected with a subordinate controller as to cause the actuation of the latter at a predetermined point in the cycle of movement of the master controller. The subordinate controller is so connected with a second subordinate controller as to cause the actuation of the latter at a predetermined interval after the actuation of the first subordinate controller. In like manner any desired number of subordinate controllers may be connected together and actuated in sequence. Each subordinate controller is normally operable in fixed relation to the operations of the other subordinate controllers, and any change in the movement of the master controller affects each of the subordinate controllers in sequence. The controllers and devices to be controlled are so connected that the latter may be locked without interfering with the actuation of one controller by another at the proper time.

Preferably when used in connection with rug printing machines, one or more of the controllers are so shaped and connected that the actuation of the controller or controllers effects the locking out of action of the printing block or blocks controlled thereby, while another or others of the controllers are so formed and connected that the actuation of such controller or controllers effects the unlocking of the printing block or blocks controlled thereby.

The characteristic features and advantages of my improvements will more fully appear from the following description and the accompanying drawings of a preferred embodiment of my invention.

In the drawings Fig. 1ª is a broken side elevation of one end of a rug printing machine having my improvements applied thereto; Fig. 1ᵇ is a broken side elevation of the other end of the same machine; Fig. 10 is a broken plan view diagrammatically illustrating the character of the product of the machine.

As above pointed out my improvements are particularly applicable to machines having members operable in predetermined but variable sequence, and is illustrated in the drawings applied to a usual type of machine for printing rug designs on linoleum, such machine comprising a frame 1 supporting a bed or platen 2 over which pin belts 3 on opposite sides of the platen are movable step by step by a usual star wheel mechanism or Geneva movements (not shown) operated from the main driving shaft; the pin belts drawing over the bed the fabric 4 from the roll 5.

Eccentrics 6 are rotated, through suitable gearing, to alternately engage the slotted rocker 7, which is thereby rocked on its axis and, through the pitman 8, oscillates the lever 9, having one end pivoted on the frame and the other end connected through the link 10 with the color distributors 11. The color distributors are thereby reciprocated on the tracks 12 to apply suitable coloring matter to the faces of the respective center printing blocks 13^A and border printing blocks 13^B fixed in the respective heads 14.

The heads 14 are mounted on slides 15 movable vertically in guides fixed to the frame. Rollers 17 are fixed to the slides in the paths of the cams 18 and 19 which are rotated through transverse shafts 20 from the main driving shaft so as to elevate the printing blocks into position for inking and press the inked blocks down against the fabric.

Shafts 21, journalled in the frame, have fixed thereon the latches 22 adapted for movement into engagement with lugs 23 on the slides 15 to hold them in elevated position at desired intervals, the latches being so mounted and balanced as to normally fall free from the lugs and the cams 18 having high spots or portion whereby the slides are lifted sufficiently high to permit the latches to disengage from the lugs. Keepers 24, journalled in the frame adjacent the latches 22, may be manually operated to lock the latches in latching position.

A cam 25, operated from the main driving shaft in synchronism with the cams 18, has a face groove 26, similar in contour to the periphery of the cams 18, and in which is engaged the roller 27 of a reciprocable rod 28 for continuously operating a master controller and intermittently operating subordinate controllers.

The forward end of the rod has pivoted thereto an arm 29 of a flanged disk 30 of the master controller, such disk being journalled on a shaft 31 mounted in the hanger 32 depending from the frame 1. The disk 30 has pivoted thereon a pawl 33 housed between the disk 30 and the concentric flanged disk or shell 34 and having a tail 33′ projecting through the slot between the disk flanges.

Figure 2:
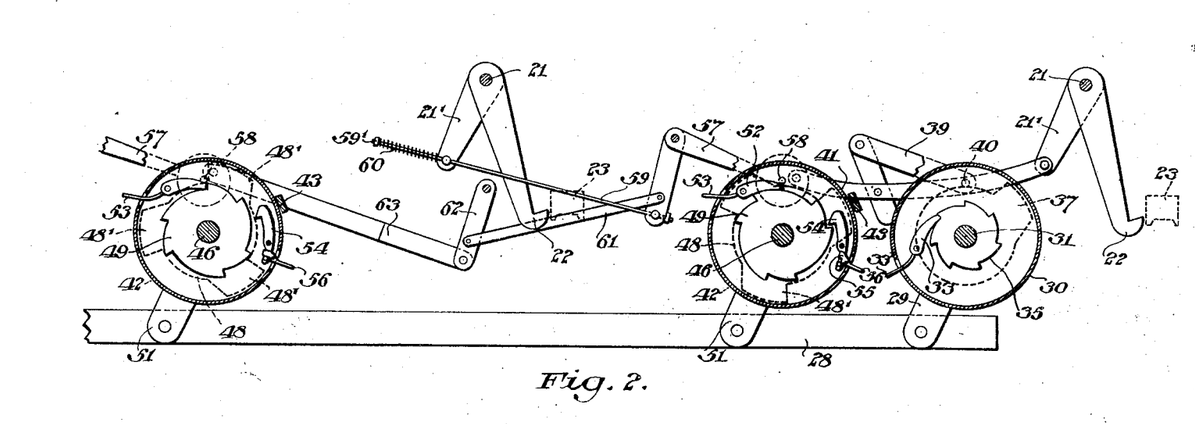
Fig. 2 is an enlarged view of the controllers shown in Fig. 1ᵇ detached from the machine and with parts broken away to show the interior construction.
Figures 7, 9:
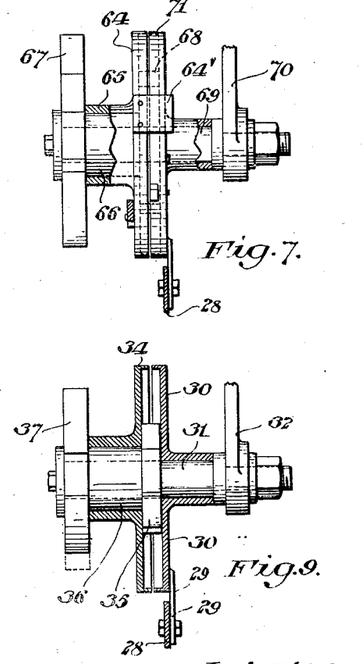
Fig. 7 is an axial sectional view of the controller shown in Fig. 6.
Fig. 9 is a broken axial view of the master controller.
Figure 8:
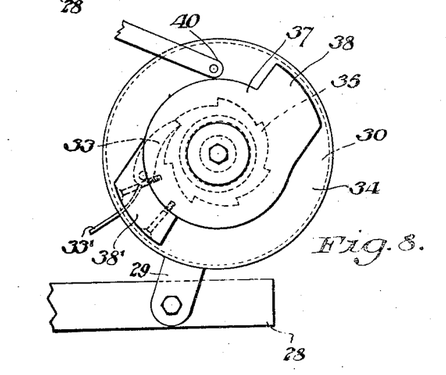
Fig. 8 is a broken elevation of a master controller with a supplementary nose thereon.

A ratchet 35, sleeved on the shaft 31 with its teeth in the path of the pawl 33, is connected through the collar 36 with a cam 37 having a fixed shoulder or nose 38 and a detachable nose 38′ (Figs. 2, 8, and 9).

A bell crank 39, fulcrumed on the frame 1, has on one arm thereof a roller 40 which engages the periphery of the cam 37; the other arm of the bell crank 39 being pivotally connected with the curved link 41. One end of the link 41 is pivotally connected with an arm 21′ on the first shaft 21 at the feed end of the machine so that the corresponding latch 22 may be rocked into and out of engagement with the lug 23 on the first slide (Figs. 1^B and 2).

The other end of the link 41 is pivotally connected with a disk 42 of a subordinate controller above the axis thereof. The disk 42 is provided with a peripheral lug or stop 43 and with a sleeve 44 rotatable on the collar 45 which is revoluble on the shaft 46 mounted in the hanger 47 depending from the frame 1. The collar 45 has fixed on one end thereof a cam 48 provided with three projections or shoulders 48′, and to the other end of the collar 45 is fixed a ratchet 49, having three spaced pairs of teeth, housed between the flanged disk 42 and a flanged disk 50 journalled on the shaft 46.

The disk 50 is pivotally connected by an arm 51 with the rod 28 and has pivoted thereto a pawl or dog 52 adapted for coaction with the teeth of the ratchet 49, the pawl having a tail 53 projecting through the slot between the flanges of the disks 42 and 50. A pawl or dog 54 is pivotally mounted on the disk 50, its toothed end, adapted for coaction with the ratchet 49, being heavier than its tail which is normally engaged by the pivoted detent 55 having a tail 56 projecting through the slot between the flanges of the disks 42 and 50 and into the path of the lug or trip 43.

A bell crank 57, fulcrumed on the frame, has a weighted arm provided with a roller 58 engaging the periphery of the cam 48. The other arm of the bell crank 57 has pivoted thereto a rod 59 which makes sliding connection with the arm 21′ of the second latch shaft 21. A coiled spring 60 is interposed between the arm 21′ and the stop 59′ on the end of the rod, forming a resilient connection by which the latch 22 is moved to latching position by the movement of the rod 59 in one direction, but the rod is permitted to slide through the arm 21′ when the latch 22 is locked by the keeper 24.

Figure 4:
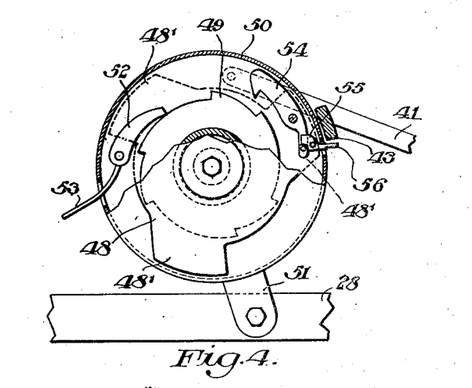
Fig. 4 is a broken sectional view of a center printing block controller with its parts in different positions from that shown in Figs. 1ᵇ, 2 and 3.
Figure 5:
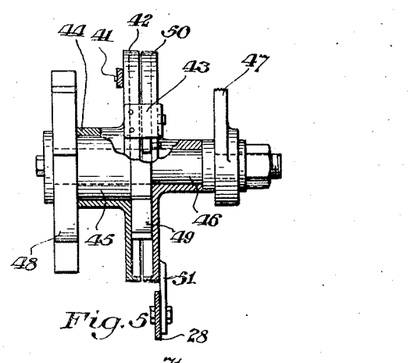
Fig. 5 is an axial view of the controller shown in Fig. 4.

The bell crank 57 is also connected through the pivoted link 61, fulcrumed arm 62 and pivoted link 63, with the disk 42 of a further subordinate controller in all respects like that shown in Figs. 4 and 5 and above described, the elevation of the roller 58 by a shoulder 48′ of the first subordinate controller acting through the intervening lever and link mechanism to rotate the disk 42 of the second subordinate controller to bring the peripheral lug 43 thereof into position for tripping the detent member 56 and releasing the pawl 54 of the second subordinate controller to effect the actuation of the ratchet 49 and cam 48 thereof as a result of the oscillation of the disk 50 and its pawls by the rod 28.

Figure 3:
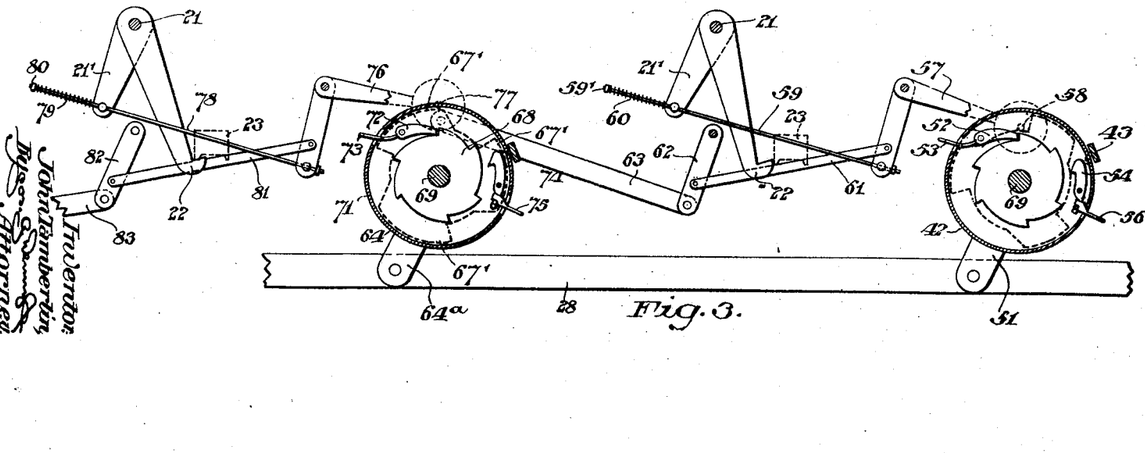
Fig. 3 is an enlarged view of the controllers shown at the right of Fig. 1ª, detached from the machine and with parts broken away to show the interior construction.

Any desired number of heads 14 may be equipped with center printing blocks 13^A and controlled by subordinate controllers such as illustrated in Figs. 4 and 5, and the link 63 connected with the controllers for the last center-printing block is connected with and controls the first of a series of subordinate controllers for controlling the heads having seated therein border printing blocks 13$^B$, as illustrated in Fig. 3.

Figure 6:
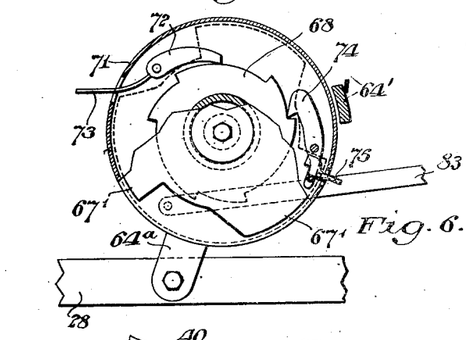
Fig. 6 is a broken sectional view of a border printing block controller with its parts in different positions from that shown in Figs. 1ª, and 3.

Each border printing block controller comprises a disk 64 provided with a peripheral lug 64' and with a collar 65 journalled on a sleeve 66. The sleeve 66 has fixed on the ends thereof a cam 67 (having spaced shoulders 67') and the ratchet 68 and is revoluble on the shaft 69 mounted in the hanger 70 on the frame 1. A disk 71, journalled on the shaft 69, is connected by an arm 64$^a$ with the rod 28 and has pivoted thereto a dog 72 provided with a tail 73 projecting through the slot between flanges of the disks 63 and 71. A second pawl or dog 74, pivoted to the disk 71, is so mounted that its toothed head tends to overbalance its tail, which is normally engaged by the detent 75 projecting through the slot between flanges of the disks 64 and 71 into the path of the trip 64' when the latter is moved by the rotation of the disk 64. A bell crank 76, fulcrumed on the frame 1, has on a weighted arm thereof a roller 77 contacting with the periphery of the cam 67. The other arm of the bell crank has connected therewith a rod 78 which passes through an apertured arm 21' on the shaft 21. A spring 79 is interposed between the arm 21' and the head 80 of the rod 78 so that such rod has an elastic connection with the arm, whereby the arm is rocked by the movement of the rod in one direction but the rod is movable freely relatively thereto in the opposite direction. The bell crank 76 is also connected through the link 81, fulcrumed arm 82 and link 83 with the disk 64 of a further subordinate controller like that shown in Figs. 6 and 7 for controlling the next border printing head.

It will be observed that the cam 48 has its shoulders 48' so proportioned and arranged relatively to the teeth of the ratchet 49 that when the dogs on the disk 50 operate the ratchet two complete oscillations of the rod 28 are required to move a shoulder 48' under the roller 58 of the bell crank 57 and but one oscillation of the rod 28 is required to remove a shoulder 48' from under a roller 58, whereas the cam 67 has its shoulders 67' so proportioned and arranged relatively to the teeth of the ratchet 68 that when the dogs on the disk 71 actuate the ratchet 68 two complete oscillations of the rod 28 are required of move a shoulder 67' from under a roller 77 and but one complete oscillation of the rod 28 is required to move a shoulder 67' under a roller 77.

The rods 63 are connected with the disks actuated thereby above the axes of such disks so that each controller thrown by a rod 63 is connected with rod 28 immediately after a shoulder 48' of a preceding controller has passed under the corresponding bell crank roller 58, whereas the rods 83 are connected with the disks actuated thereby below the axes of such disks so that each controller thrown by a rod 83 is connected with the rod 28 immediately after a shoulder 67' of a preceding controller has moved from under the corresponding bell crank lever 77.

Figures 1A, 10:
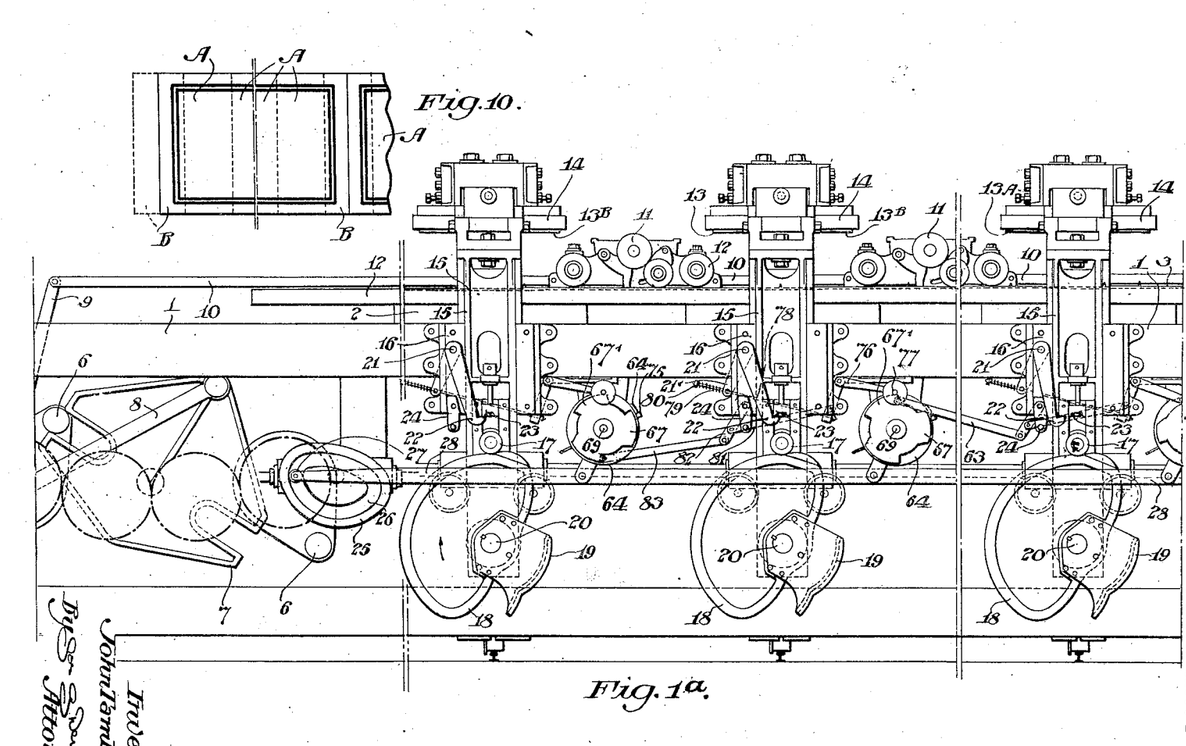
Figure 1B:
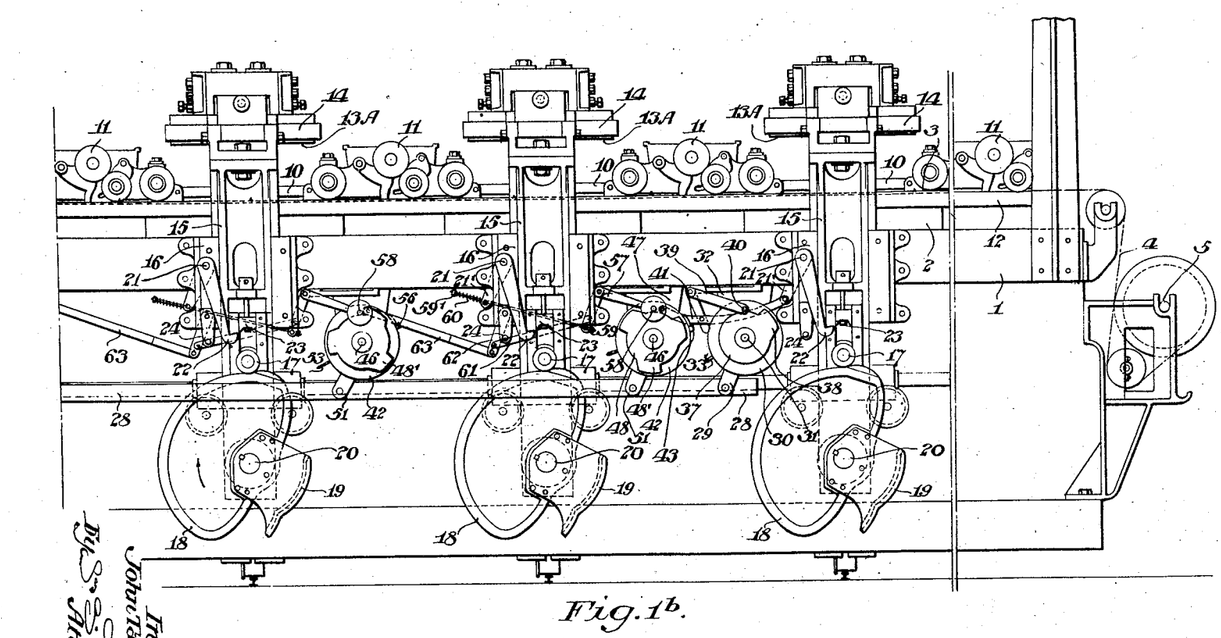

In the operation of the machine to produce a rug, such as indicated in Fig. 10, such number of center printing blocks 13$^A$ are used as may be necessary to imprint the desired number of colors to form the design A, the repetition of which forms the center or body of the rug, and such number of border printing blocks 13$^B$ are used as may be necessary to print the number of colors required for producing the design B of the double border for two adjacent rugs.

The fabric 4 to be printed is moved through the machine step by step by the pin belt 3 in alternation with the reciprocation of the printing blocks 13$^A$ and 13$^B$. As the heads 14 are elevated by the slides 15 due to the action of the cam 18, the rod 28 is moved to the left (Figs. 1$^a$ and 1$^b$, and as the heads 14 descend to print the fabric the rod 28 is moved to the right, by the engagement of its roller 27 in the cam groove 26. During the "dwell" of the heads 14 in their upper positions, the rocker 7 reciprocates the color distributors to ink the printing blocks, the pin belts 3 advance the fabric the width of a printing block, and the rod 28 is stationary.

As shown in Figs. 1$^a$, 1$^b$, 2 and 3, of the drawings, the parts are in the position occupied at the beginning of a cycle of operations for printing a rug. The printing heads are all up, all but the last (not shown) of the heads supporting the border printing blocks 13$^B$ being latched up by the respective latches 22, owing to the engagement of the shoulders 67' with the rollers 77, and all the heads supporting the center printing blocks 13$^A$ unlatched and free to reciprocate under control of the cams 18, owing to the disengagement of the shoulders 38 and 48' from the rollers 40 and 58.

The first of the center printing block heads (at the right Fig. 1$^b$) has just been elevated by the high point of the cam 18 so as to permit the first latch 22 to disengage from the lug 23, where it was left latched at the conclusion of the preceding cycle of operations. The color distributors 11 are about to be moved to ink the printing heads and the fabric 4 is about to be moved a step toward the left. The fabric section about to be moved from under the first printing head at the right of Fig. 1$^b$ has not been printed thereby, this head having been latched up during the time such section was under the head, and such section being later printed by the blocks 13$^B$ to form a border.

The preceding movement of the shoulder 38 of the master controller under the roller 40 has rotated the disk 42 to move the lug 43 into position to trip the detent 56 to permit the toothed dog 54 to engage the ratchet 49, and in the position shown in Fig. 1ᵇ and 2 the oscillation of the rod 28 during the period when the first printing block was latched out of action has caused the dog 54 to rotate the ratchet 49 and cam 48 so that the first roller 58 lies midway between adjacent shoulders 48' of such cam of the first subordinate controller, and the dog 54 is falling by gravity into position to be latched by the detent 56.

Upon the completion of the movements of the distributors 11 and the pin belts 3 (shown as about to take place in Figs. 1ᵃ and 1ᵇ) the center printing blocks descend under control of the cams 18 and 19 to form an impression upon the cloth, the rod 28 simultaneously moving to the right, and the pawls of the controller sliding idly over their complementary teeth.

As the printing heads are elevated by the cams 18, the rod 28 moves to the left and rotates the disks 30, 50 and 71. In this movement, the pawl 33 engages a tooth of the ratchet 35 and rotates the cam 38 one step; the pawl 52 engages the first of a pair of adjacent teeth of the ratchet 49 and rotates the cam 48 so as to bring a shoulder 48' under the roller 58 of the first subordinate controller of the center printing blocks; the pawl 52 of the controllers for the border printing blocks (except the last) slide idly between pairs of teeth of the ratchet 68, and the dog 72 of the last of the border printing block controllers engages the second of a pair of teeth of the ratchet 68 so as to move the corresponding shoulder 67' under the last roller 77 to rock the last bell crank 76 and latch 22 to latch the last of the border printing blocks in its elevated position.

The movement of a shoulder 48' of the first subordinate controller under the roller 58 rocks the first bell crank 57 and acts through the link 59, spring 60, arm 21 and shaft 20 to move the corresponding latches 22 under the lugs 23 of the second slide 15 and latch the second center printing block 13ᴬ in elevated position during the passage thereunder of the first or border section B of the fabric 4 to be printed.

The rocking of the first bell crank 57 also acts through the link 61, fulcrumed arm 62 and link 63 to rotate the second disk 42 on its axis so as to move its lug 43 into position to trip the complementary detent 56. The tripping of this detent permits the dog 54 of the second subordinate controller to fall into engagement with a tooth of the ratchet 49 and move such ratchet, as the rod 28 moves toward the left, to bring the first of a succeeding pair of ratchet teeth into position to be engaged by the pawl 52 upon the next reciprocation of the rod 28. This movement of the ratchet 49 by the dog 54 moves the cam 48 so that the roller 58 lies midway between adjacent shoulders 48' of the cam. The further movement of the ratchet resulting from the engagement of the dog 52 with the first of the pair of teeth effects the movement of a shoulder 48' of the second subordinate controller under the roller 58 on the second bell crank 57 to cause the latching of the third center printing block and the movement of the disk 42 of the third subordinate printing block controller in the manner above described in connection with the preceeding elements. Any desired number of center printing blocks may be controlled sequentially in the same manner.

When the first or border section of the fabric being printed reaches the last of the center printing blocks 13ᵃ, the last of the bell cranks 57 is rocked by the last of the controller cams 48 to latch the last of the center printing blocks in elevated position.

Simultaneously the last of the bell cranks 57 acts through the last of the links 63 to rotate the first of the disks 64 and bring its lugs 64' into position to trip the detent 75. The tripping of the detent 75 permits the dog 74 to drop into engagement with an adjacent tooth of the ratchet 68 so that upon the movement of the rod 28 to the left the ratchet 68 is moved into position such that the first of a succeeding pair of teeth can be acted upon by the dog 72. The next reciprocation of the rod 28 causes the dog 72 to rotate the ratchet 68 one step and move the shoulder 67' from under the roller 77, so that the first bell crank 76 is rocked and moves the rod 78 to permit the disengagement of the latch 22 from the lug 23 and descent of the first of the border printing blocks to print the first color of the border design. The next reciprocation of the rod 28 causes the dog 72 to engage the second of the pair of teeth of the ratchet 68 so as to again move a shoulder 67' of the cam 67 under the roller 77, thereby rocking the bell crank 76 and again latching the first border printing block in its elevated position.

The movement of the shoulder 67' from under the roller 77 and the consequent rocking of the bell crank 76 acts through the link 81, arm 82 and link 83 upon the disk 64 of the second border printing block controller, the disk being thereby rotated and moving the lug 64' thereof into position for tripping the detent 75 of the second printing block controller to effect the operation thereof and the unlatching of the second border printing head. Any number of border printing heads and controllers therefore may be provided and will operate in sequence in the manner above described.

It should be noted that the disk-operating links connected with the center printing block controllers are connected with the next succeeding disk above the axis thereof so as to effect the operation of such disk when the preceding bell crank is rocked upon a shoulder 38 or 48' whereas the disk-operating links connected with the border printing block controllers are connected with the next succeeding disks below the axis thereof so as to operate such disks when the preceding bell crank drops off of a shoulder 67'.

Each reciprocation of the rod 28 effects a movement of the shoulder 38 of the master controller a distance proportionate to the character of the ratchet 35. When the rotation of the shoulder 38 brings it under the roller 40, the bell crank 39 is rocked and acts through the link 41, arm 21' and shaft 21 to thrust the latch 22 under the lug 23 of the first printing head so as to prevent the engagement thereof with the portion of the fabric forming the end section of the printed rug and the first section of the ensuing rug, upon which portion the borders for the two rugs are to be printed. The rocking of the bell crank 39 also acts through the link 41 and disk 42 to move the lug 43 of the first subordinate center printing block controller into the path of the detent 56 to release the dog 54 and permit it to drop into engagement with a tooth of the ratchet 49 and rotate such ratchet into the position shown in Figs. 1b and 2, ready to repeat the cycle of operations.

Any desired number of duplications of the center pattern or design relatively to the border pattern or design may be secured by merely substituting a cam 37 and ratchet 35 having a suitable number of teeth for the cam and ratchet shown. The machine will normally print as many sections A of the fabric with the center design between the border designs as there are teeth on the ratchet 35 less one.

When it is desired to make very short rugs with very few center design sections, a detachable nose or shoulder 38' may be secured upon the periphery of cam 37 opposite the shoulder 38. By manually disengaging the dog 33 from the ratchet 35 by means of the finger piece 33', center sections may be printed continuously as long as required, or by manually rotating the cam 37 so as to bring the shoulder 38 into engagement with the roller 40 a border design section can be printed after any desired center design section. It is thus possible by a mere adjustment of a single master controller to make rugs of any desired length, and to vary the length of such rugs while being printed, since each subordinate controller, and the head controlled thereby, is dependent upon the preceding controller and therethrough upon the master controller. It is also possible to eliminate any desired color from the design, by merely manually operating the appropriate keeper 24 to hold the corresponding latch 22 in position to latch up the proper head 14, without in any way interfering with the operation of the remaining heads of the machine, since the sliding engagement of the rods 59 and 78 with the arms 22 permit the operation of the control mechanism entirely independent of the number of heads which may be eliminated from operation.

While I have shown the center printing blocks arranged in heads in sequential series and the border printing blocks arranged in heads in sequential series, this is not at all necessary as a border printing block may be substituted for a center printing block at any point or vice versa, and its operation in proper sequence to imprint its designs in proper position upon the fabric being printed secured by merely substituting a cam 67 for a cam 48, or vice versa, and appropriately connecting the links 63 or 83 above or below the axis of the next succeeding controller disk.

Having described my invention, I claim:

1. The combination with a plurality of devices to be controlled, of mechanism comprising a controller for each of said devices, one of said controllers being operable by another of said controllers, said last named controller being a continuously operating master controller.

2. The combination with a plurality of reciprocating printing heads to be controlled and locking mechanisms for holding said heads in elevated position, of controllers for the respective heads, each of said controllers having means for operating one of said locking mechanisms and one of said controllers having means for operating another of said controllers.

3. The combination with a plurality of reciprocating printing heads to be controlled and locking mechanisms for holding said heads in elevated positions, of means operable in predetermined relation to the movement of one of said heads to operate the locking mechanism thereof, means for operating the locking mechanism of another of said heads, a source of power, and means controlled by said means first named for operatively connecting said means second named with said source of power.

4. The combination with a controller, of a locking mechanism operated by said controller, a second controller, a source of power, means operated by said controller first named for connecting said second controller and said source of power and a locking mechanism operated by said second controller.

5. The combination with a plurality of devices to be controlled, of controllers for the respective devices, one of said controllers being a continuously operating master controller, a source of power, and means controlled by one of said controllers for operatively connecting another of said controllers with said source of power.

6. The combination with a plurality of devices to be controlled, of a controller for each of said devices, one of said controllers being operable by another thereof to effect the sequential operation of said devices and one of said controllers being a continuously operating master controller.

7. The combination with a plurality of devices to be controlled, of cam mechanism for controlling each of said devices in a continuous cyclic operation, means for operating said cam mechanisms, and means controlled by one of said cam mechanisms for effecting the actuation of another of said cams by said operating mechanism.

8. The combination with a plurality of devices to be controlled, of a controller for each of said devices, means for operating said controllers, a detent normally preventing the operation of one of said controllers by said operating means, and means controlled by another of said controllers for tripping said detent.

9. The combination with locking mechanism, of means comprising a cam for operating said locking mechanism, means for operating said cam, members for connecting and disconnecting said first and second named means, and means for automatically operating said members, said means last named comprising a master controller effecting a continuous cyclic operation.

10. The combination with a plurality of devices to be controlled, of a controller for each of said devices, means for operating said controllers, members for connecting and disconnecting one of said controllers with said operating means, a detent engaging one of said members, and means controlled by another of said controllers for tripping said detent.

11. The combination with a plurality of controlled devices, of a controller for each of said devices, and means for operating said controllers, one of said controllers being operable constantly by said means, another of said controllers being operable by said means when the first named controller has affected its controlled device, and another of said controllers being operable by said means when the second named controller has been operated by said means.

12. The combination with a plurality of devices to be controlled, of a controller for each of said devices, and means for operating said controllers, one of said controllers being operable constantly by said means and another of said controllers being operable to affect its controlled device when the preceding controller has affected the movement of the device controlled thereby.

13. The combination with a plurality of devices to be controlled, of a controller for each of said devices, means for operating said controllers in sequence, one of said controllers releasing its controlled device when operated and another of said controllers stopping its controlled device when operated.

14. The combination with mechanism for forming a plurality of different patterns upon adjacent sections of material, of means comprising revoluble cams for rendering inoperative a mechanism aforesaid while permitting the operation of the remaining mechanisms, said cams being rotatable one after another.

15. The combination with mechanisms for forming a plurality of different patterns upon adjacent sections of material, of controllers for mechanisms aforesaid and each comprising a ratchet having a cam operable thereby, means for operating said ratchet, and means operable by the cam of one controller for releasing the ratchet operating means of another controller.

16. The combination of a master controller comprising a cam, means for constantly operating said cam step by step, a subordinate controller comprising a cam, means operable by the cam of the master controller for effecting the actuation of the cam of the subordinate controller, a third controller comprising a cam, and means operable by said second cam for effecting the operation of the third cam.

17. The combination of a ratchet, a cam operable by said ratchet, a pawl for operating said ratchet, and latching mechanism operable by said cam.

18. The combination of a housing, a ratchet within said housing, a pawl for operating said ratchet and having a finger-piece projecting from said housing, a cam operable by said ratchet, and latching mechanism operable by said cam.

19. The combination of a movable cam, a second movable cam, a ratchet for operating said second named cam, pawl mechanism for actuating said ratchet, means operable by said cam first named for tripping said pawl mechanism, latching mechanism operable by said cam second named and a reciprocatory head controlled by said latching means.

20. The combination with a movable cam, pawl and ratchet mechanism for continuously operating said cam step by step, lever mechanism operable by said cam, a second pawl and ratchet mechanism controlled by said lever mechanism, a cam operable by said second pawl and ratchet mechanism, and latching mechanism operable by said cam second named.

21. The combination with a plurality of cams and lever mechanisms operable thereby, means for operating the respective cams, the connections of said operating means with cams aforesaid being controlled by lever mechanisms aforesaid, latching devices operable by cams aforesaid and reciprocating printing heads controlled by said latching devices.

22. The combination of a plurality of cams, latching devices operable by cams aforesaid reciprocable heads controlled by said devices, actuating means operable independently of said heads, means operable by one of said cams when latching a device aforesaid for connecting another cam and said actuating means, and means operable by one of said cams when unlatching a device aforesaid for connecting another cam and said actuating means.

23. The combination with a movable cam, trip mechanism operable by said cam, a pawl controlled by said trip mechanism, a ratchet operable by said pawl and having spaced sets of teeth, a second pawl for operating said ratchet when positioned by said first pawl, latching mechanism operable by said last named cam and reciprocable heads controlled by said latching mechanism.

24. The combination of a cam, a trip mechanism operable by said cam, a pawl controlled by said trip mechanism, a ratchet operable by said pawl, a second pawl for operating said ratchet when positioned by said first pawl, a cam operable by said ratchet, a latching device operable by said cam second named, trip mechanism operable by said cam last named, a pawl controlled by said last named trip mechanism, a ratchet operable by said last named pawl, a pawl for operating said ratchet last named when positioned by said pawl last named, a cam operable by said last named ratchet, and latching device operable by said last named cam.

Signed at Philadelphia, in the county of Philadelphia and State of Pennsylvania, this 8th day of September, 1924.

JOHN TAMBERLIN.